(12) United States Patent
Buschmann

(10) Patent No.: US 9,233,437 B2
(45) Date of Patent: Jan. 12, 2016

(54) FORMING BODY FOR SEALING AN OBJECT TO BE WELDED, MORE PARTICULARLY A PIPE

(75) Inventor: Michael Buschmann, Dinslaken (DE)

(73) Assignee: Mitsubishi Hitachi Power Systems Europe GMBH, Duisburg (DE)

( * ) Notice: Subject to any disclaimer, the term of this patent is extended or adjusted under 35 U.S.C. 154(b) by 0 days.

(21) Appl. No.: 14/241,410

(22) PCT Filed: Aug. 31, 2012

(86) PCT No.: PCT/EP2012/067015
§ 371 (c)(1),
(2), (4) Date: May 9, 2014

(87) PCT Pub. No.: WO2013/030364
PCT Pub. Date: Mar. 7, 2013

(65) Prior Publication Data
US 2014/0246482 A1    Sep. 4, 2014

(30) Foreign Application Priority Data
Aug. 31, 2011 (DE) .................. 10 2011 053 171

(51) Int. Cl.
| B23K 31/02 | (2006.01) |
| B23K 37/00 | (2006.01) |
| B23K 9/028 | (2006.01) |
| B23K 9/16 | (2006.01) |
| B23K 9/32 | (2006.01) |
| B23K 37/053 | (2006.01) |

(52) U.S. Cl.
CPC .............. *B23K 37/00* (2013.01); *B23K 9/028* (2013.01); *B23K 9/16* (2013.01); *B23K 9/326* (2013.01); *B23K 31/027* (2013.01); *B23K 37/0531* (2013.01); *B23K 2201/06* (2013.01); *Y10T 29/49826* (2015.01)

(58) Field of Classification Search
None
See application file for complete search history.

(56) References Cited

U.S. PATENT DOCUMENTS

| 3,736,400 A | * | 5/1973 | Spiegel et al. ............... 219/60 A |
| 3,754,115 A | * | 8/1973 | Roberts et al. ............... 219/60.2 |
| 3,924,677 A | * | 12/1975 | Prenner et al. ................ 166/100 |
| 4,357,960 A | | 11/1982 | Han |
| 5,186,214 A | | 2/1993 | Savard |

(Continued)

FOREIGN PATENT DOCUMENTS

DE    695 18 689 T2    1/2001
EP    WO 2008/113369 A1 *    9/2008

(Continued)

OTHER PUBLICATIONS

International Preliminary Report on Patentability mailed Feb. 28, 2014, for International Application No. PCT/EP2012/067015 filed Aug. 31, 2012.

(Continued)

*Primary Examiner* — Kiley Stoner
(74) *Attorney, Agent, or Firm* — Knobbe Martens Olson & Bear LLP

(57) ABSTRACT

In some embodiments, a forming body for the temporary sealing of a flow cross-section of an assigned object to be welded is disclosed. In some embodiments, the forming body comprises a dimensionally stable, preferably biologically-degradable material, which has a water solubility ≥90% and of which the main component is corn starch and/or corn semolina and/or corn flakes.

2 Claims, 2 Drawing Sheets

(56) References Cited

U.S. PATENT DOCUMENTS

Figure 1:
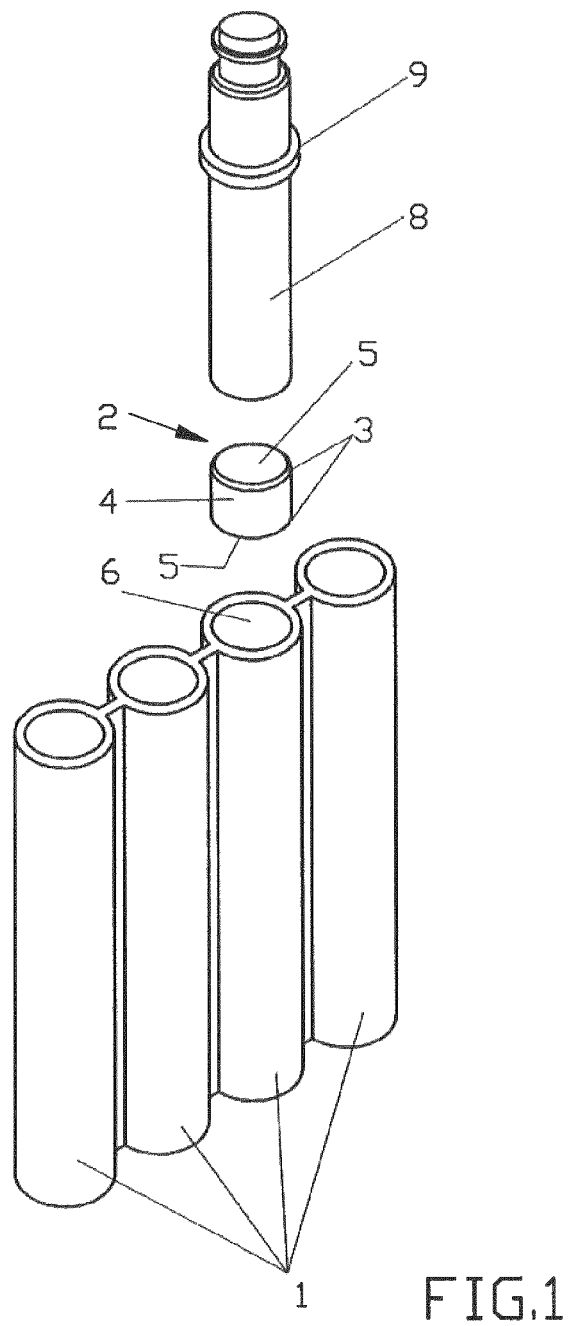

| | | | |
|---|---|---|---|
| 5,318,075 A | 6/1994 | Roll | |
| 5,361,972 A * | 11/1994 | Barker | 228/219 |
| 5,639,518 A * | 6/1997 | Ando et al. | B29C 35/12 |
| | | | 219/771 |
| 5,685,372 A | 11/1997 | Gano | |
| 6,083,456 A | 7/2000 | Van Rees | |
| 6,251,431 B1 | 6/2001 | Van Rees | |
| 6,619,326 B1 | 9/2003 | Pryne | |
| 6,712,097 B1 | 3/2004 | Schabel | |
| 8,061,388 B1 * | 11/2011 | O'Brien et al. | 138/89 |
| 8,616,432 B1 * | 12/2013 | Hacikyan | 228/42 |
| 2005/0121444 A1 * | 6/2005 | Trochlil | D21H 17/11 |
| | | | 219/730 |
| 2009/0166338 A1 | 7/2009 | Sato | |

FOREIGN PATENT DOCUMENTS

| | | | | |
|---|---|---|---|---|
| JP | 62 270281 A | | 11/1987 | |
| JP | 62270281 A | * | 11/1987 | B23K 9/16 |
| JP | 63101078 A | * | 5/1988 | B23K 9/16 |
| JP | 05245633 A | * | 9/1993 | B23K 9/035 |
| JP | 09010933 A | * | 1/1997 | B23K 9/035 |
| JP | 2002 205192 A | | 7/2002 | |
| JP | 2003266176 A | * | 9/2003 | B23K 9/16 |
| JP | 2004 015994 A | | 4/2004 | |
| JP | 2004-105994 A | | 4/2004 | |
| JP | 2005144533 A | * | 6/2005 | B23K 9/028 |

OTHER PUBLICATIONS

International Search Report mailed Dec. 4, 2012, for International Application No. PCT/EP2012/067015 filed Aug. 31, 2012.

Office Action in German Patent Application No. 10 2011 053 171.8 dated Mar. 8, 2012.

* cited by examiner ial which has a water solubility of ≥90% and the main constituent of which is corn starch and/or corn semolina and/or corn flakes.

FORMING BODY FOR SEALING AN OBJECT TO BE WELDED, MORE PARTICULARLY A PIPE

RELATED APPLICATIONS

This application is the U.S. National Phase of Application No. PCT/EP2012/067015 with the English title "FORMING BODY FOR SEALING AN OBJECT TO BE WELDED, MORE PARTICULARLY A PIPE, HAVING A WATER SOLUBILITY GREATER THAN OR EQUAL TO 90%" filed Aug. 31, 2012, published in German on Mar. 7, 2013, which designated the United States, and which claims the benefit of German Application No. 10 2011 053 171.8 filed Aug. 31, 2011.

The invention is aimed at a forming body for the temporary internal sealing of a flow cross section of an assigned object to be welded, in particular of a pipe, during welding, the forming body being designed as a form body which is dimensionally stable, pressure-stable and temperature-stable and is adapted to the internal dimension to be sealed, in particular to the flow cross section to be sealed, of the object, in such a way that said forming body can be sealingly introduced, acting as a gas barrier, into the inner space, in particular the flow cross section, of the assigned object, in particular of the pipe. The invention is aimed, furthermore, at a method for welding an object, in particular a pipe, in which such a forming body is used, and at the use of such a forming body in carrying out such a method.

If, for example, it is necessary to weld an object, such as a pipe of membrane wall piping, because of maintenance work, it is customary, in order to seal the welding location, to introduce a forming body in the shape of a forming paper into the pipe to be welded, in order to build up in the pipe to be welded a gas barrier for the argon used as protective gas. Before the forming paper is introduced into the inner space of the pipe, the forming paper is compressed or crumpled together so that it can be introduced into the pipe in a more compact form. This forming paper, when used in small quantities, is water-soluble, and therefore, when the pipe system is put into operation again, it may dissolve upon contact with a liquid, in particular water. It often happens, however, that too large a quantity or excessively large pieces of forming paper are introduced into the pipes for welding purposes, as a result of which, although sealing during welding is improved, nevertheless, after welding, these pieces, because of their size, can no longer dissolve so easily upon contact with a liquid and during circulation inside the pipes, with the result that blockages may occur in the respective pipe, and this may lead, in turn, to cracks in the pipe. In order to remove the blockages, it is customary in each case to cut into the individual pipes, push them open, flush them by hydraulic pressure for each individual pipe and subsequently weld them and check the quality of the weld seam by X-raying the latter. However, this entails high costs and requires a large amount of time and much labor.

The object on which the invention is based, therefore, is to provide a solution, by means of which reliable sealing of an object, in particular of a pipe, during welding can be ensured, and by means of which blockages in the welded object which are caused by a forming body can be avoided.

With regard to a forming body of the type referred to more specifically at the beginning, this object is achieved, according to the invention, in that the forming body is composed of a dimensionally stable, preferably biologically degradable material which has a water solubility of ≥90% and the main constituent of which is corn starch and/or corn semolina and/or corn flakes.

Furthermore, the invention is achieved by means of a method for welding an object, in particular a pipe, in which a forming body designed as claimed in one of claims 1 to 3 is introduced into an inner space of the object and the inner space of the object is sealed by means of the forming body introduced, the object sealed by means of the forming body is welded under protective gas, in particular argon, after welding, a liquid, in particular water, is introduced into the inner space of the object, and the forming body is brought into contact with the liquid in the inner space of the object, the forming body being dissolved as a result of contact with the liquid.

Finally, the invention is achieved by using a forming body designed as claimed in one of claims 1 to 3 for carrying out a method as claimed in one of claims 4 to 7.

Expedient refinements and advantageous developments of the invention are the subject matter of the respective subclaims.

The forming body according to the invention differs from the forming body produced from a forming paper, inter alia, in that the former forming body is now dimensionally stable, which means that it is, in particular, pressure-stable and temperature-stable, that is to say its shape does not change when pressure and/or an increased temperature are/is applied. The forming body according to the invention thus has already in its initial state the shape with which it is introduced as a seal into the inner space of the object to be welded. A prior change in shape, as in the case of the forming paper, is therefore not provided and is no longer necessary in the forming body according to the invention. The time for preparing an object to be welded can thereby be reduced. The forming body, in its initial state, that is to say in its state immediately after production, has immediately a shape already adapted to the inner space of the object to be welded, so that reliable sealing of the object during welding can be ensured. Since the forming body according to the invention already has in its initial state the shape and size with which it is also introduced into the inner space of the object, the situation can be prevented where too large a quantity of forming body or a forming body made excessively large is introduced into the inner space of the object. Due to the very high water solubility of the forming body according to the invention of ≥90%, preferably of 100%, when a liquid, in particular water, is added to the object after it has been welded, the forming body can dissolve without or with only very slight residues and can be flushed out of the inner space of the object. Blockages of the inner space of the object by the forming body can thereby be prevented completely. Moreover, the dissolving of the forming body as a result of contact with the liquid can take place especially quickly, so that the inner space of the object is free again very quickly and can be put into operation.

Moreover, for this purpose, there is provision according to the invention whereby the material of the forming body comprises a corn material, in particular corn starch, corn flakes and/or corn semolina. The corn material is preferably mixed with water to produce the forming body. The corn material is preferably the main constituent of the forming body or of the material of the forming body. The forming body made from a corn material is distinguished by especially good water solubility, the forming body being capable of dissolving, preferably without any residue, upon contact with a liquid, in particular water, irrespective of the size of the forming body. Moreover, by being produced from a corn material, the forming body is preferably completely biologically degradable and is produced from a renewable raw material.

According to a preferred refinement of the invention, the forming body is of an at least essentially spherical or cylindrical design. Due to the spherical or cylindrical configuration, the forming body is adapted with as exact a fit as possible to the inner face of the inner space of the object to be welded, so that the forming body can be in contact extensively against the inner wall of the inner space of the object, with the result that reliable sealing of the inner space of the object by means of the forming body during the welding of the object can be ensured. If, however, for example, a profile with a rectangular cross section is to be welded, it is likewise possible that the forming body has in its initial state not a circular cross section, but instead a rectangular cross section. It is also possible that the forming body has other shapes in its initial state, in which case it is essential here merely that the forming body, in its initial state, is adapted with its outer circumferential face to the inner circumferential face of the object to be sealed, in such a way that the forming body is in contact with its outer circumferential face extensively against the inner circumferential face of the object to be sealed, such as, for example, a pipe or a profile, and the escape of gas can be prevented.

In order to make it easier to introduce the forming body into the inner space of the object to be welded, there is advantageously provision whereby the forming body has an edge region with a chamfer. Preferably, this chamfer is formed in the transitional region or the edge region between an end face and a longitudinal side face of the forming body.

Furthermore, in the method according to the invention, there is advantageously provision whereby the forming body is introduced into the inner space of the object by means of an introduction tool. By means of the introduction tool, the forming body can be positioned at the desired location inside the object. The introduction tool may be designed, for example, in the shape of an elongate cylindrical plunger, so that the forming body is pressed into the inner space of the object by means of the introduction tool. In order to prevent the situation where the introduction tool is introduced too far into the inner space of the object and therefore the forming body is also introduced too far into the inner space of the object, there may be formed on the outer circumferential face of the introduction tool a protuberance, preferably a ring-shaped protuberance, which has a larger outer circumference or diameter than the inner circumference or inside diameter of the inner space of the object to be welded.

In particular, the forming body is used in the welding together of steel pipes and in this case preferably in the welding together of a membrane (pipe) wall of a steam boiler of a power plant. The method according to the invention is therefore distinguished, in one refinement, in that a steel pipe is welded or welded together, while, according to a further refinement, there is in particular provision whereby a membrane wall of a steam boiler of a power plant is welded or welded together.

Figure 2:
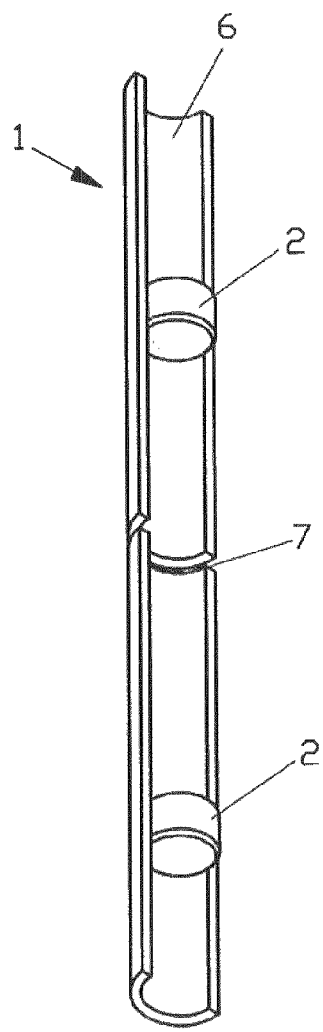

The invention is explained in more detail below by means of a preferred exemplary embodiment, with reference to the accompanying drawings in which:

FIG. 1 shows a diagrammatic illustration of a forming body according to the invention while it is being introduced by means of an introduction tool into an object to be welded, and FIG. 2 shows a diagrammatic illustration of the object to be welded in a sectional view along its longitudinal axis with two forming bodies according to the invention arranged in the object to be welded.

In the preferred exemplary embodiment shown here, the object to be welded is a pipe. FIG. 1 shows a pipe arrangement composed of four pipes 1 connected to one another.

Furthermore, FIG. 1 shows a forming body 2 according to an embodiment of the invention, while it is being introduced into an inner space 6 of one of the four pipes 1. The forming body 2 is produced from a dimensionally stable, compact material which has a water solubility of ≥90%. For this purpose, the material of the forming body 2 preferably has as its main constituent a corn material, in particular corn starch, corn flakes and/or corn semolina.

The forming body 2, as early as when it is being produced, acquires the shape with which it is introduced into the pipe 1 for the purpose of sealing the latter. In the embodiment shown here, the forming body 2 is of cylindrical design, the two edge regions 3 of the forming body 2 having a chamfer between the longitudinal side face 4 of the forming body 2 and the two end faces 5 of the forming body 2, so that the edge regions 3 are of slanted form. It thereby becomes easier to introduce the forming body 2 into the pipe to be welded.

Before a pipe 1 is welded, the forming body 2 is introduced into the inner space 6 of the pipe 1, so that the inner space 6 is sealed by the forming body 2, the forming body 2 serving as a gas barrier, the intention, in particular, being to prevent the situation where argon, as the protective gas used during welding, can flow laterally out of the inner space 6 of the pipe 1 to be welded. As shown in FIG. 2, a forming body 2 is arranged in each case in front of and behind a location 7 to be welded. After the welding of the pipe 1, water is introduced as a liquid into the inner space 6 of the pipe 1, the forming body 2 dissolving in a short time, without any residue, as soon as it comes into contact with the water.

In order to make it easier to introduce the forming body 2 into the inner space 6 of the pipe 1, an introduction tool 8 is used, which is designed in the shape of an elongate cylindrical plunger. For this purpose, the outer circumferential face of the introduction tool 8 is smaller than the inner circumferential face of the inner space 6 of the pipe 1, so that the introduction tool 8 can penetrate at least partially into the inner space 6 of the pipe 1. By means of the introduction tool 8, the forming body 2 can be positioned at the desired location inside the pipe 1 by the introduction tool 8 pressing onto an end face 5 of the forming body 2 and thereby pushing the forming body into the inner space 6 of the pipe 1. In order to prevent the situation where the introduction tool 8 is introduced too far into the pipe 1 and therefore the forming body 2 is also introduced too far into the pipe 1, there is formed on the outer circumferential face of the introduction tool 8 a ring-shaped protuberance 9 which has a larger outer circumference or diameter than the inner circumference or inside diameter of the inner space 6 of the pipe 1 to be welded.

The forming body is composed at least in its main constituents, but preferably completely, of corn starch, corn semolina or corn flakes or mixtures of these constituents. In particular, it is composed of a material which is composed solely of hydrocarbon, such that it is produced as a pure hydrocarbon body and, in particular, contains no sodium. The forming body is composed of a material which yields an ash content of 0.29% during incineration according to DIN 51719. The forming body is likewise produced from a material which, when dissolved in fully demineralized water, yields a pH value of 6.6. Finally, the forming body is produced from a material, in particular corn starch or a mixture of this with corn semolina and/or corn flakes, in such a way that it dissolves in a water bath or a water solution to an extent such that, when it is filtered off by means of conventional filter paper used in chemical laboratories, a residue which can be filtered off of 7.6% is formed. In this respect, therefore, water solubility amounts, in particular, to 92.4%.

The invention claimed is:

1. A method for welding a steel pipe comprising:
introducing a forming body into an inner space of a steel pipe to be welded, wherein the forming body sealingly acts as a gas barrier for the temporary internal sealing of a flow cross section of the steel pipe,
welding the steel pipe under protective gas, wherein the steel pipe is sealed by the forming body during welding;
after welding, introducing a liquid into contact with the inner space of the steel pipe; and
dissolving the forming body as a result of contact with the liquid,
wherein the forming body is composed of a biologically degradable material the main constituent of which is corn starch and/or corn semolina and/or corn flakes and which has a water solubility of ≥90% and which yields an ash content of 0.29% during incineration according to DIN 51719 and a pH value of 6.6 when dissolved in fully demineralized water,
wherein the forming body, already in its initial state as produced, has a cylindrical shape and size that is adapted to the inner space of the steel pipe to ensure a reliable sealing of the inner space of the steel pipe during welding and has an edge region with a chamfer which is formed in the transitional region between an end face and a longitudinal side face of the forming body and wherein the forming body is dimensionally stable, pressure-stable, and temperature-stable so that its shape does not change when pressure and an increased temperature during welding are applied, and
when the forming body is introduced into the inner space of the steel pipe and is positioned at the desired location inside the steel pipe by means of an elongated, cylindrical introduction tool which presses onto an end face of the forming body when the forming body is pressed into the inner space of the steel pipe by means of the introduction tool, wherein the forming body is in contact with its outer circumferential face extensively against an inner circumferential face of the steel pipe.

2. The method of claim 1, wherein the steel pipe is in a membrane wall of a steam boiler of a power plant.

* * * * *